US008705101B2

United States Patent
Nemoto

(10) Patent No.: US 8,705,101 B2
(45) Date of Patent: Apr. 22, 2014

(54) PRINTING SYSTEM AND PRINTING DEVICE HAVING TWO INFORMATION TRANSMISSION PATHS

(75) Inventor: Masakazu Nemoto, Ibaraki (JP)

(73) Assignee: Ricoh Company, Limited, Tokyo (JP)

( * ) Notice: Subject to any disclaimer, the term of this patent is extended or adjusted under 35 U.S.C. 154(b) by 252 days.

(21) Appl. No.: 13/234,627

(22) Filed: Sep. 16, 2011

(65) Prior Publication Data

US 2012/0069398 A1  Mar. 22, 2012

(30) Foreign Application Priority Data

Sep. 16, 2010  (JP) .................................. 2010-208590
Sep. 7, 2011  (JP) .................................. 2011-194909

(51) Int. Cl.
*G06F 3/12* (2006.01)
(52) U.S. Cl.
USPC ......................................................... 358/1.15
(58) Field of Classification Search
USPC ......................................................... 358/1.15
See application file for complete search history.

(56) References Cited

U.S. PATENT DOCUMENTS

| 5,748,859 A | * | 5/1998 | Takayanagi et al. | ............ 358/1.9 |
| 2008/0186667 A1 | * | 8/2008 | Verdiell et al. | ................. 361/686 |
| 2008/0288690 A1 | * | 11/2008 | Namba | .......................... 710/113 |
| 2009/0138647 A1 | * | 5/2009 | Hagita | ........................... 710/316 |

FOREIGN PATENT DOCUMENTS

| JP | 2002-254763 | 9/2002 |
| JP | 4123993 | 5/2008 |

* cited by examiner

*Primary Examiner* — Fred Guillermety
(74) *Attorney, Agent, or Firm* — Oblon, Spivak, McClelland, Maier & Neustadt, L.L.P.

(57) ABSTRACT

A printing system includes a print-data generating device and a printing device. The print-data generating device is connected to the printing device via a first transmission path and a second transmission path of which transfer speed is faster than that of the first transmission path. A communication unit of the print-data generating unit and a communication unit of the printing device transmit to and receive from each other the image data and specific control information that affects the transfer of the image data via the second transmission path, and control information other than the specific control information via the first transmission path.

4 Claims, 11 Drawing Sheets

(TO IMAGE OUTPUT UNIT)

FIG.13

| No | CLASSIFICATION | NAME | DIRECTION (DFE ⇔ PCTL) | CONTENTS |
|---|---|---|---|---|
| 1 | JOB INFORMATION | JOB START | ⇅ | NOTIFICATION OF JOB START / RESPONSE JOB IDENTIFIER (JOBID) COMMUNICATION |
| 2 | | JOB END | ⇅ | NOTIFICATION OF END OF ALL OF PRINTING PROCESSES REQUESTED BY CORRESPONDING JOB / RESPONSE JOB IDENTIFIER (JOBID) COMMUNICATION |
| 3 | | PRINTING PROCESS RECEPTION START | ↓ | NOTIFY THAT PRINTER CAN RECEIVE PRINTING PROCESS |
| 4 | | PRINTER INFORMATION REQUEST/ NOTIFICATION | ⇅ | NEEDED PRINTER INFORMATION REQUEST / NOTIFICATION |
| 5 | | PRINTING PROCESS START | ⇅ | NOTIFY THAT IMAGE DATA IS PREPARED / RESPONSE OUTPUT ORDER, PAGE (PROCESS) UNIT |
| 6 | PRINTER STATE/ PRINTING PROCESS | PRINTING PROCESS REQUEST | ⇅ | REQUEST PRINTING PROCESS BY PRINTER CONTROLLER / RESPONSE COLOR, PROCESS IDENTIFICATION NUMBER, PLANE IDENTIFICATION NUMBER PLANE UNIT, REQUEST IN REQUEST ORDER OF ENGINE ※BITMAP IS TAKEN FROM ENGINE |
| 7 | | DATA TRANSFER COMPLETION | ↑ | NOTIFY TRANSFER COMPLETION OF REQUESTED PLANE |
| 8 | | DATA RECEPTION COMPLETION | ↓ | NOTIFY RECEPTION COMPLETION OF REQUESTED PLANE |
| 9 | | PRINTING PROCESS COMPLETION | ↑ | COMPLETE PRINTING REQUEST FOR ALL PAGES (PROCESSES) |
| 10 | | PROCESS STATE REPORT | ↓ | NOTIFY PRINTING STATE OF PROCESS ・FEEDING ・DISCHARGING ・PRINTING START |
| 11 | | SC NOTIFICATION ERROR GENERATION/RELEASE | ⇅ ↑ | ACQUIRE/NOTIFY OBSTACLE INFORMATION OF PRINTER NOTIFY OBSTACLE GENERATION/RELEASE OF UPPER LEVEL DEVICE |
| 12 | PRINTING CONDITIONS | PRINTING CONDITION SETTING | ⇅ | PRINTING CONDITION NOTIFICATION/RESPONSE ・PRINTING FORM (BOTH-SIDED PRINTING/SINGLE-SIDED PRINTING) ・PRINTING TYPE (DATA EXISTS/BLANK PAGE) ・FEEDING/DISCHARGING INFORMATION (FEEDING ORIGIN, DISCHARGING DESTINATION) ・PRINTING SURFACE ORDER (SURFACE → BACK SURFACE/ BACK SURFACE → SURFACE) ・PRINTING PAPER SIZE ・PRINT DATA SIZE ・RESOLUTION, GRADATION ・COLOR INFORMATION  ETC. |
| 13 | CONNECTION | REGISTRATION/RELEASE | ⇅ | MUTUAL REGISTRATION OF UPPER LEVEL DEVICE AND PRINTER CONTROLLER |

PRINTING SYSTEM AND PRINTING DEVICE HAVING TWO INFORMATION TRANSMISSION PATHS

CROSS-REFERENCE TO RELATED APPLICATIONS

The present application claims priority to and incorporates by reference the entire contents of Japanese Patent Application No. 2010-208590 filed in Japan on Sep. 16, 2010 and Japanese Patent Application No. 2011-194909 filed in Japan on Sep. 7, 2011.

BACKGROUND OF THE INVENTION

1. Field of the Invention

The present invention relates to a printing system and a printing device.

2. Description of the Related Art

There is a known image forming system that includes a raster image processor (RIP) and a printing device (image forming device). The RIP receives print data from a host computer and converts the print data into bitmap data. The printing device receives, from the RIP, print commands and bitmap data and then prints the data. There is a demand for a higher-speed and higher-performance image forming device. There is a known technology in which, when bitmap data is transmitted from the RIP to the image forming device, the bitmap data is subjected to a compression process and then the compressed data is transmitted, whereby the data can be transmitted while the performance of the image forming device is fully utilized.

For example, Japanese Patent Application Laid-open No. 2004-287519 discloses an image forming system that includes a front-end, a back-end, and an engine. In this system, in order to enable data transfer while the engine performance is fully utilized, a compression rate is controlled and compressed data is transmitted to a back-end processor (print control device) that is included in the image forming device.

Furthermore, there is a known technology in which a data line for transmitting image data is separated from a control line for transmitting and receiving control commands (control information). An interface that allows high-speed data transfer is used for the data line for transmitting image data so that the print speed of the overall image forming device is increased.

For example, Japanese Patent Application Laid-open No. 2002-254763 discloses a printing device in which a data line for transmitting image data is separated from a control line for transmitting and receiving control signals and an interface that allows high-speed data transfer is used for the data line for transmitting image data, whereby the print speed of the overall printing device is increased.

In a conventional image forming system that compresses data for transmission, even if the speed and performance of an image forming device are further improved, data cannot be compressed to such a degree that the performance of an engine is fully utilized, which results in a decrease in the performance of the engine.

Furthermore, in a conventional technology where a high-speed data line is separated from a control line, if an image forming device achieves a higher speed and higher performance, an interface used as a control line for transmitting and receiving control information causes a decrease in the performance of the engine because of the generation of control information, for which the processing speed is inadequate.

SUMMARY OF THE INVENTION

It is an object of the present invention to at least partially solve the problems in the conventional technology.

According to an aspect of the present invention, there is provided a printing system including a print-data generating device and a printing device. The print-data generating device is connected to the printing device via a first transmission path and a second transmission path, the second transmission path having a higher transfer speed than that of the first transmission path. The print-data generating device includes a generating unit that generates print data, and a first communication unit that transmits the print data to the printing device via the second transmission path and that transmits and receives control information to and from the printing device via the first transmission path. The printing device includes a printing unit that prints the print data, and a second communication unit that receives the print data from the print-data generating device via the second transmission path and that transmits and receives the control information to and from the print-data generating device via the first transmission path, the first communication unit transmits and receives, to and from the printing device via the second transmission path, specific control information that is included in the control information and that affects transfer of the print data, and the second communication unit transmits and receives the specific control information to and from the print-data generating device via the second transmission path.

According to another aspect of the present invention, there is provided a printing system including an upper level device and a printing device. The printing device includes a plurality of data transfer control units that store in memories image data transferred from the upper level device, an output control unit that controls printing of the image data stored by the data transfer control units, and a print control unit that controls the data transfer control units and the output control unit. The upper level device is connected to the print control unit through a first transmission path, the upper level device is connected to the data transfer control units through a second transmission path, the second transmission path having a higher transfer speed than that of the first transmission path, the upper level device and the print control unit transmit and receive control information to and from each other through the first transmission path, and the upper level device and each of the data transfer control units transmit and receive the image data to and from each other through the second transmission path.

According to another aspect of the present invention, there is provided a printing device that is connected to an upper level device. The printing device includes a plurality of data transfer control units that store in memories image data transferred from the upper level device, an output control unit that controls printing of the image data stored by the data transfer control units, and a print control unit that controls the data transfer control units and the output control unit. The print control unit is connected to the upper level device through a first transmission path, each of the data transfer control units is connected to the upper level device through a second transmission path, the second transmission path having a higher transfer speed than that of the first transmission path, the print control unit transmits and receives control information to and from the upper level device through the first transmission path, and each of the data transfer control units transmits and receives the image data to and from the upper level device through the second transmission path.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 13 is a schematic diagram illustrating an example of control information that is transmitted and received between the upper level device and the printer controller of the printing device according to the second embodiment;

DETAILED DESCRIPTION OF THE PREFERRED EMBODIMENTS

An exemplary embodiment of a printing system and a printing device according to the present invention is explained in detail below with reference to the accompanying drawings.

First Embodiment

Figure 1:
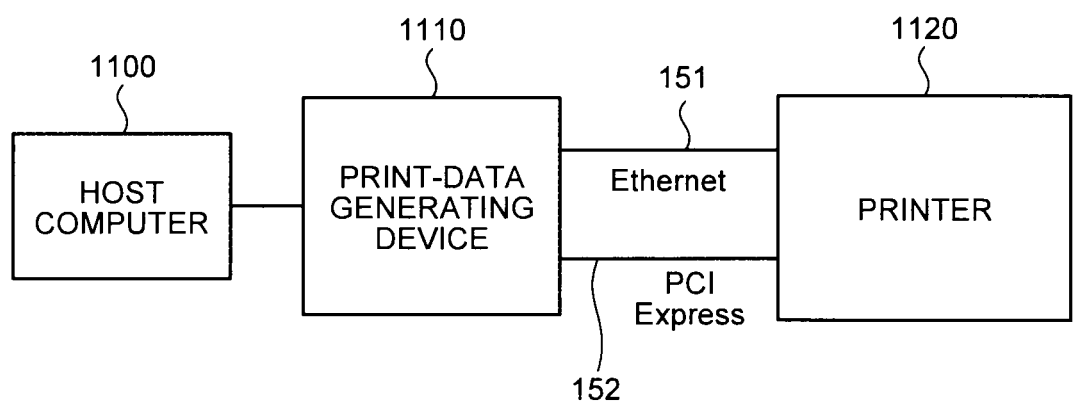
FIG. 1 is a block diagram illustrating an exemplary configuration of a printing system that can be applied to a first embodiment.

FIG. 1 is a block diagram illustrating an exemplary configuration of a printing system that can be applied to a first embodiment. The printing system includes a host computer 1100, a print-data generating device 1110, and a printer 1120 that is a printing device.

The host computer 1100 is, for example, a personal computer (PC) or server that requests the printer 1120 to perform printing.

The print-data generating device 1110 is connected to the printer 1120 via a control line 151 that is a first transmission path and via a data line 152 that is a second transmission path. The transfer speed of the data line 152 is higher than that of the control line 151. For example, the control line 151 can be structured by a transmission path that is compatible with Ethernet®, and the data line 152 can be structured by a transmission path that is compatible with PCI Express.

The control line 151 and the data line 152 are not limited to those described above, and any combination may be used as long as the transfer speed of the data line 152 is higher than that of the control line 151. The number of the control line 151 and the data line 152 is not limited to one. For example, a plurality of data lines 152 corresponding to colors of a color image may be provided.

The print-data generating device 1110 performs a process using the RIP (hereinafter may be called "RIP process") in accordance with print job data that is fed from the host computer 1100 and generates bitmap data that is print image data. Together with the bitmap data, the print-data generating device 1110 generates control information for controlling a printing operation in accordance with the print job data, information on the host computer 1100, and the like.

The print image data generated by the print-data generating device 1110 is fed to a printer engine (a printer engine 1140 illustrated in FIG. 2) of the printer 1120 via the data line 152. The print-data generating device 110 transmits and receives control information to and from a print control unit (a print control unit 132 illustrated in FIG. 2) of the printer 120 via the control line 151. The print control unit of the printer 120 controls the printer engine in accordance with the transmission and reception of control information and executes printing in response to a print job.

Figure 2:
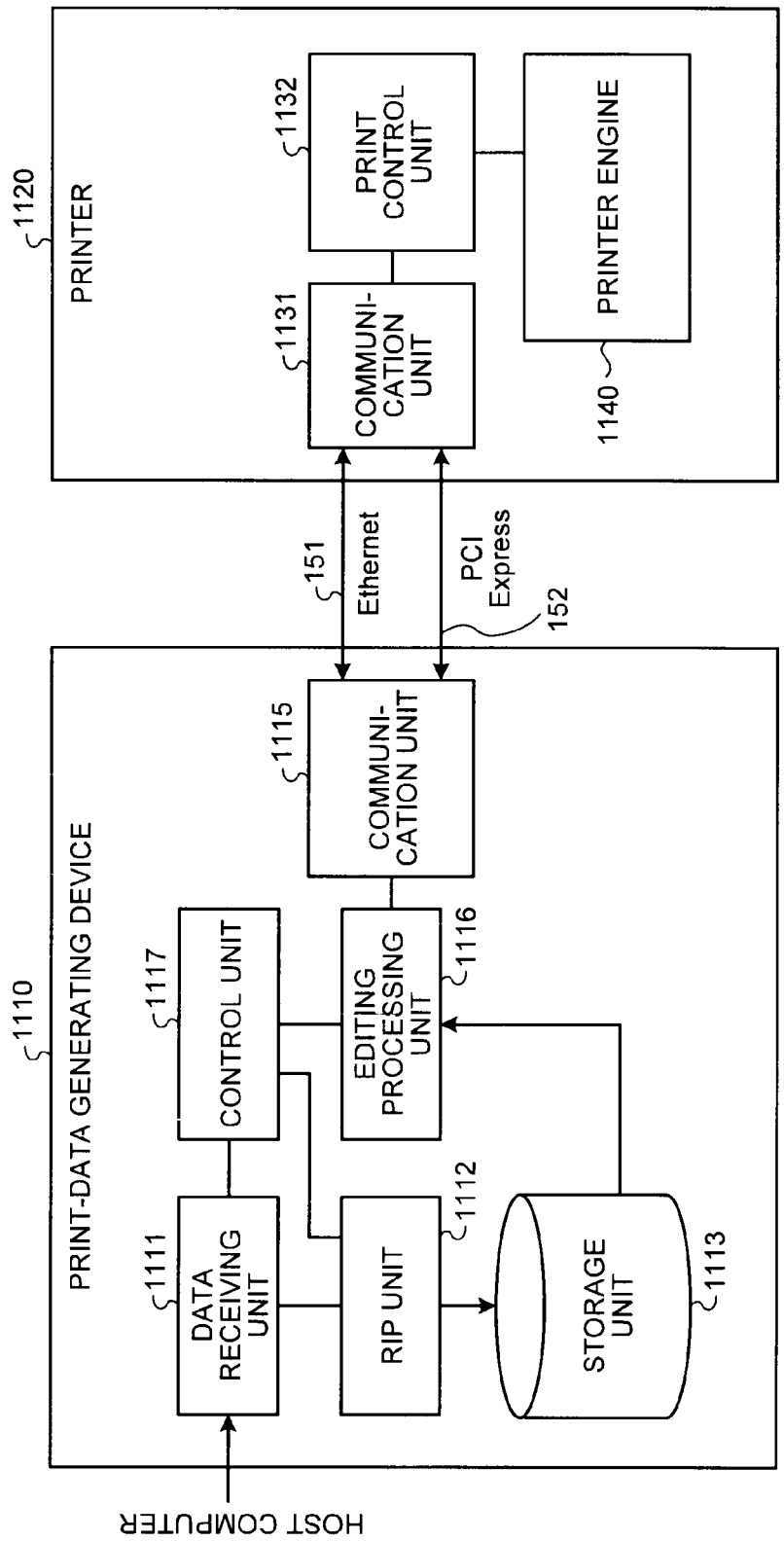
FIG. 2 is a block diagram illustrating an example of a detailed configuration of a print-data generating device and a printer according to the first embodiment.

FIG. 2 is a block diagram illustrating an example of a detailed configuration of the print-data generating device 1110 and the printer 1120 according to the first embodiment. As illustrated in FIG. 2, the print-data generating device 1110 includes a data receiving unit 1111, an RIP unit 1112 that is a generating unit, a storage unit 1113, a communication unit 1115 that is a first communication unit, an editing processing unit 1116, and a control unit 1117. The printer 1120 includes a communication unit 1131 that is a second communication unit, the print control unit 1132, and the printer engine 1140 that is a printing unit.

The data receiving unit 1111 receives from the host computer 1100 various types of data, such as print job information. The control unit 1117 controls each component of the print-data generating device 1110 in accordance with a predetermined control program. The control unit 1117 analyzes data received by, for example, the data receiving unit 1111 and sends it to the editing processing unit 1116.

The editing processing unit 1116 edits the data sent from the control unit 1117 to obtain a command parameter for a loading process and sends it to the RIP unit 1112. The RIP unit 1112 generates bitmap print image data in accordance with the command parameter received from the editing processing unit 1116 and loads it into the storage unit 1113 that functions as a page memory.

The communication unit 1115 transmits and receives control information to and from the communication unit 1131 of the printer 1120 via the control line 151. The communication unit 1115 also transmits and receives control information to and from the communication unit 1131 via the data line 152 and transmits print image data to the communication unit

1131 via the data line 152. For example, the communication unit 1115 transmits, to the communication unit 1131 of the printer 1120 via the data line 152, print image data that is loaded into the storage unit 1113.

In the present embodiment, the communication unit 1115 transmits and receives, to and from the communication unit 1131 via the data line 152, specific control information that is included in the control information and that affects the transmission of print data. The communication unit 1115 transmits and receives control information except for the specific control information to and from the communication unit 1131 via the control line 151.

If PCI Express is used as the data line 152, different virtual channels may be used for control information and print image data. Thus, it is possible to prevent interruption between control information and print image data during data transfer.

As described above, the communication unit 1131 transmits and receives control information and print image data to and from the communication unit 1115 of the print-data generating device 1110.

By using the control information that is transmitted and received via the control line 151, the print control unit 1132 transmits and receives commands and status information to and from the printer engine 1140 so as to control a printing process of the printer engine 1140.

Under the control of the print control unit 1132, the printer engine 1140 prints images on a paper by using the print image data.

Figure 3:
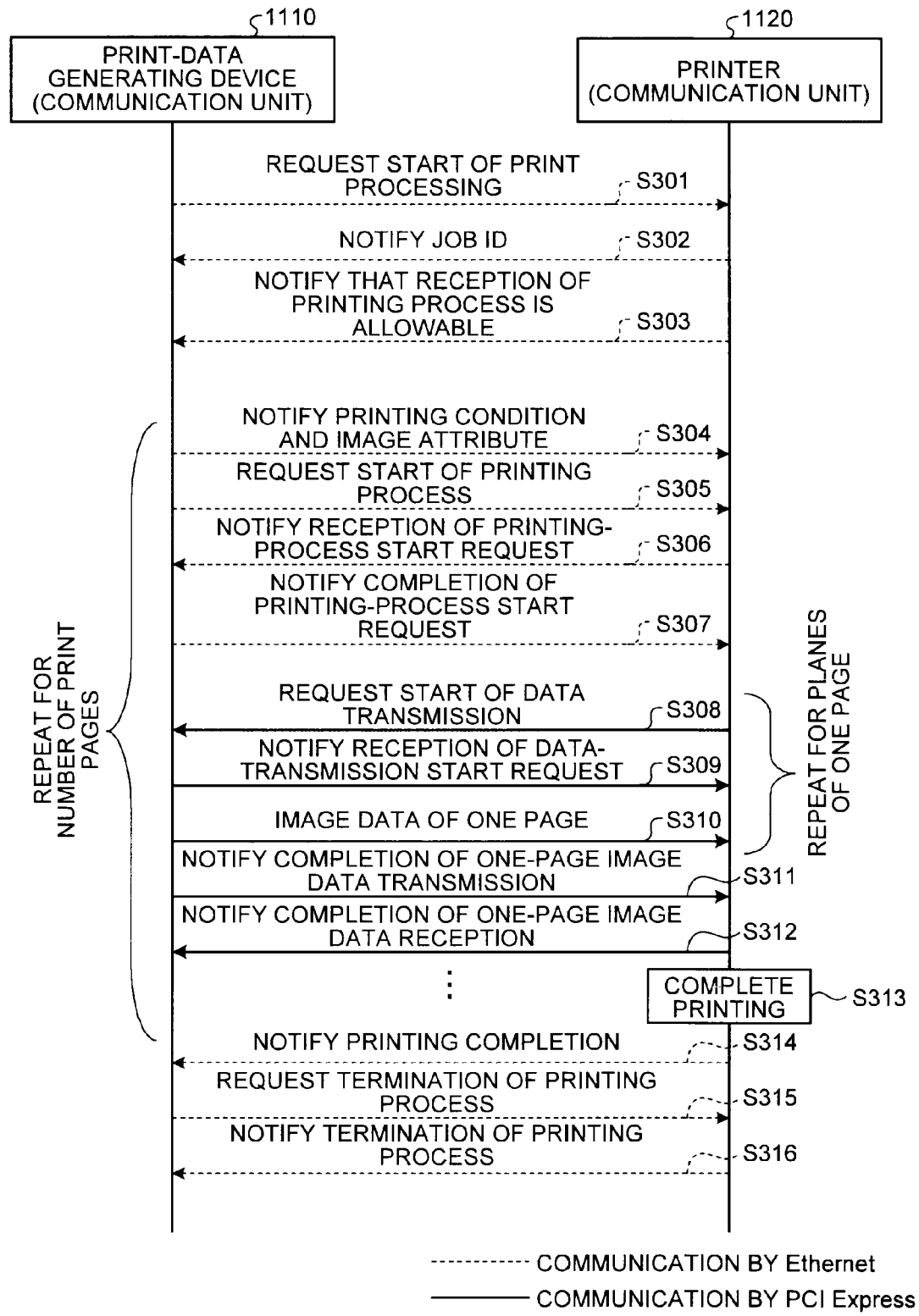
FIG. 3 is a sequence diagram illustrating the overall flow of print processing in the first embodiment.

Next, an explanation is given, with reference to FIG. 3, of a printing process performed by the print-data generating device 1110 and the printer 1120 that are configured as described above according to the present embodiment. FIG. 3 is a sequence diagram illustrating the overall flow of print processing in the first embodiment.

In FIG. 3, the communication performed via the control line 151 (Ethernet®) is indicated by the dashed arrow, and the communication performed via the data line 152 (PCI Express) is indicated by the solid arrow.

The control unit 1117 of the print-data generating device 1110 transmits, to the printer 1120 via the communication unit 1115 and the control line 151, control information that requests the start of print processing (job) (Step S301). In response to the control information, the print control unit 1132 of the printer 1120 transmits, to the print-data generating device 1110 via the communication unit 1131 and the control line 151, control information that notifies a job ID (Step S302).

The print control unit 1132 acquires a resource to execute the job in accordance with the start of the job. The print control unit 1132 then transmits, to the print-data generating device 1110 via the control line 151, control information that indicates that reception of the printing process is allowable (Step S303).

Next, the process described below from Step S304 to Step S314 is repeated for the number of pages to be printed.

The control unit 1117 of the print-data generating device 1110 transmits, to the printer 1120 via the communication unit 1115 and the control line 151, control information that notifies the print control unit 1132 of a printing condition and image attribute (Step S304). A printing condition to be set in the print control unit 1132 includes, for example, a print form, print type, sheet discharge/feeding information, the order of pages to be printed, the size of a printing paper, data size, resolution, and tone of print image data, and color information. Information on the number of pages to be printed may be included in the printing condition. When this control information is received by the print control unit 1132, various printing conditions included in the received control information are written in a register, or the like, of the print control unit 1132 so that the printing conditions are set.

The print-data generating device 1110 then transmits, to the print control unit 1132 via the control line 151, control information that requests the start of a printing process for the first page (Step S305). This control information includes a process identification number that identifies the process and an image identification number that indicates an image of the first page. The print control unit 1132 sends, to the print-data generating device 1110, control information that notifies the reception of the printing-process start request in response to the printing-process start (Step S306). In response to this control information, the print-data generating device 1110 transmits, to the printer 1120, control information that notifies the completion of the printing-process start request (Step S307).

The print control unit 1132 then transmits, to the print-data generating device 1110 via the data line 152, control information that requests the start of transmission of the print image data (Step S308).

Here, the control information that requests the start of transmission of the print image data is specific control information that affects the transmission of the print data. Therefore, the print control unit 1132 transmits the control information to the print-data generating device 1110 via the data line 152 instead of the control line 151. Because the control information to be transmitted at Steps S309, S311, and S312 also affects the transmission of print data, the control information is transmitted and received via the data line 152.

In response to this control information, the control unit 1117 of the print-data generating device 1110 transmits, to the printer 1120 via the communication unit 1115 and the data line 152, control information that notifies the reception of the data-transmission start request (Step S309). Furthermore, the control unit 1117 transmits print image data of one page to the printer 1120 via the data line 152 (Step S310).

Upon completion of transmission of the print image data of one page, the print-data generating device 1110 transmits to the printer 1120 control information that notifies the completion of data transmission (Step S311). In response to this control information, the print control unit 1132 transmits to the print-data generating device 1110 control information that notifies the completion of reception of the print image data (Step S312).

After transmitting to the print-data generating device 1110 control information that notifies the completion of reception of the print image data of the first page, the print control unit 1132 executes printing by using the received print image data. Upon completion of the printing (Step S313), the print control unit 1132 transmits, to the print-data generating device 1110 via the communication unit 1131 and the control line 151, control information that notifies the completion of printing of the first page (Step S314).

When receiving the control information that notifies the completion of printing of all pages, the control unit 1117 of the print-data generating device 1110 transmits, to the printer 1120 via the control line 151, control information that requests termination of the print processing (Step S315). When receiving this control information, the print control unit 1132 of the printer 1120 transmits, to the print-data generating device 1110 via the control line 151, control information that notifies the termination of the print processing (Step S316), whereby a series of print processing is terminated.

According to the present embodiment, in a system that includes a printer and a print-data generating device that executes the RIP, the transmission and reception of control information, for which the processing speed is adequate, is performed via a control line (Ethernet®, or the like). The transmission and reception of control information (specific control information), for which the processing speed is inadequate, and the transmission of print data are performed via a data line (PCI Express, or the like) that allows high-speed transmission of large-volume data. Thus, even if uncompressed data is transmitted, the data can be transmitted while the performance of the image forming device is fully utilized. In the case of a higher-speed and higher-performance image forming device (printer), the engine performance can be fully utilized during data transfer.

Because it is not necessary to control a compression rate or perform a compression process or decoding process, it is possible to reduce the number of processes and costs for development. Furthermore, a control line, which is a conventional interface, is used for control information for which the processing speed is adequate; thus, it is possible to make the smallest change to software and to reduce the number of developing processes.

Second Embodiment

In the second embodiment, the printing system is applied to a production printing. First, in order to help with understanding, production printing to which a printing system according to each embodiment is applied will be schematically described. In general, the production printing is used when a large capacity of printing is performed in a short time. For this reason, in the production printing, there is constructed a work flow system for controlling from a print data generation to a print distribution, in order to efficiently perform a job control or a print data control, as well as improving the print speed. The print system according to each embodiment involves a part for implementing the print operation in the work flow for the production printing. In the system, a process using the RIP (hereinafter may be called "RIP process") is performed by a device different from a device for printing the bitmap data obtained through the RIP process. Since the RIP process requires the longest processing time in the printing process, it is possible to improve the print speed by performing the RIP process and the printing process by different devices.

<Outline of Printing System Applicable to Each Embodiment>

Figure 4:
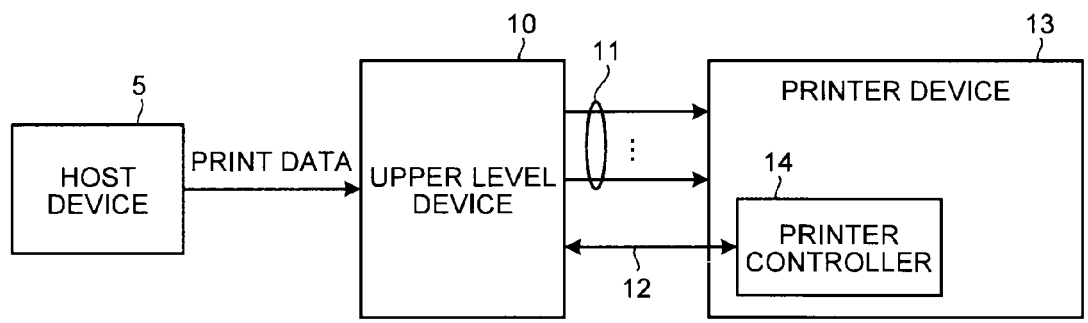
FIG. 4 is a block diagram illustrating an example of the configuration of a printing system that can be applied to a second embodiment.

FIG. 4 illustrates an example of the configuration of a printing system that can be applied to the second embodiment. The printing system is provided with an upper level device 10, a printer device 13 as an image forming device, a plurality of data lines 11, and a control line 12. The upper level device 10 is connected with the printer device 13 via the plurality of data lines 11 and the control line 12. A host device 5 may be a computer for example to generate print job data including print image data and print set information.

In the present embodiment, the transmission speed of the data line 11 is faster than that of the control line 12. The control line 12 functions as a first transfer path and is structured by a transfer path that is compatible with Ethernet®. The data line 11 functions as a second transfer path and is structured by a transmission path that is compatible with PCI Express.

The print job data may include data written in PDL (Page Description Language) (hereinafter referred to as "PDL data") for example. The print set information relating to the print setting including print page information, layout information, print run information, as well as the print image data composed of the bitmap image for printing, is generated by interpreting the PDL data.

The upper level device 10 performs the RIP process in accordance with the print job data supplied from the host device 5 to generate the each color bitmap data as print image data. Along with that, the upper level device 10 generates control information for controlling the print operation, on the basis of the print job data and the information from the host device 5.

The print image data for each color generated by the upper level device 10 is supplied to a printer engine unit (not shown) of the printer device 13 through the plurality of data lines 11. Between the upper level device 10 and a printer controller 14, the control information for controlling the print operation is transmitted/received through the control line 12. The printer controller 14 controls the printer engine unit on the basis of the transmitted/received control information to form an image on a print medium, thereby perform the print operation according to the print job.

The printing method is not limited in particular. However, in each embodiment, printing paper is used as the printing medium and a printing image is formed on the printing paper using an inkjet system. However, the present invention is not limited thereto and each embodiment can be applied to the printing device that forms a printing image on the printing paper using toner. As the printing paper, continuous paper (continuous stationery) where perforations to be cut are provided at a predetermined interval is used. In the production printing, the continuous paper is mainly used as the printing paper. However, the present invention is not limited thereto and cut paper where a size is fixed to an A4 size or a B4 size may be used as the printing paper. In the continuous paper, a page means a region that is interposed by perforations provided at a predetermined interval.

The printing medium that is printed by a printing system according to each embodiment is not limited to printing paper such as paper. That is, other printing media that can be printed by a printing system applied to each embodiment and can be provided as a roll may be used. For example, a plastic film or cloth may be used as the printing medium.

<Upper Level Device>

Figure 5:
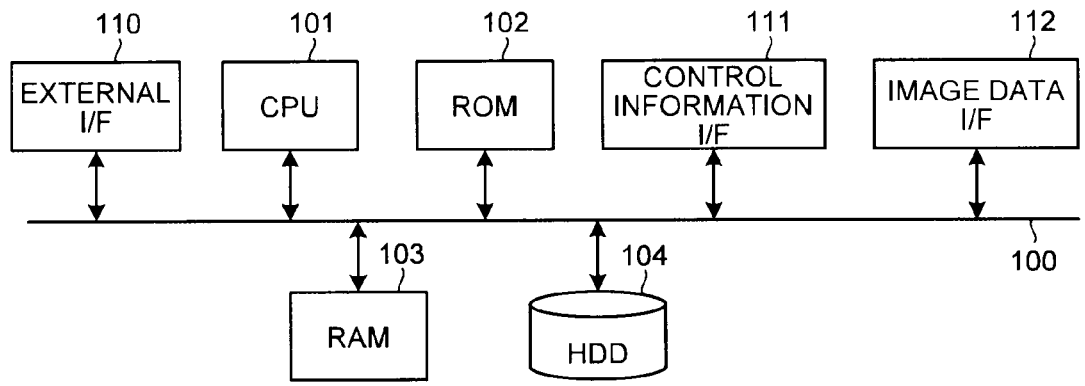
FIG. 5 is a block diagram illustrating an example of the configuration of an upper level device according to the second embodiment.

FIG. 5 illustrates an example of the configuration of the upper level device 10. A central processing unit (CPU) 101, a read only memory (ROM) 102, a random access memory (RAM) 103, and a hard disk drive (HDD) 104 are connected to a bus 100. An external I/F 110, a control information I/F 111, and a print image data I/F 112 are connected to the bus 100. The individual units that are connected to the bus 100 can communicate with each other through the bus 100.

In the ROM 102 and the HDD 104, a program to operate the CPU 101 is stored in advance. The RAM 103 is used as a work memory of the CPU 101. That is, the CPU 101 uses the RAM 103 as the work memory according to the program stored in the ROM 102 and the HDD 104 and controls all the operations of the upper level device 10.

The external I/F 110 corresponds to, for example, a transmission control protocol/Internet Protocol (TCP/IP) and controls communication with the host device 5. The control information I/F 111 controls communication of control information. Since the print image data I/F 112 controls communication of print image data, the print image data I/F 112 has plural channels. For example, print image data of each color such as yellow (Y), cyan (C), and magenta (M), and black (K) that is generated in the upper level device 10 is output from the plural channels. Since a high-speed transfer speed is required in the print image data I/F 112, the peripheral component interconnect bus express (PCI Express) may be employed. A type of the control information I/F 111 is not limited in particular. However, in this case, similar to the print image data I/F 112, the PCI Express is used.

In this configuration, print job data that is transmitted from the host device 5 is received in the external I/F 110 of the upper level device 10 and is stored in the HDD 104 through the CPU 101. The CPU 101 executes the RIP process on the basis of the print job data read from the HDD 104, generates bitmap data of each color, and writes the bitmap data in the RAM 103. For example, the CPU 101 renders page description language (PDL) data by the RIP process, generates bitmap data of each color, and writes the bitmap data in the RAM 103. The CPU 101 compresses and encodes the bitmap data of each color that is written in the RAM 103 and temporarily stores the bitmap data in the HDD 104.

For example, when a print operation starts in the printer device 13, the CPU 101 reads the compressed and encoded bitmap data of each color from the HDD 104, decodes the compressed code, and writes the extended bitmap data of each color in the RAM 103. The CPU 101 reads the bitmap data of each color from the RAM 103, outputs the bitmap data as the print image data of each color from each channel of the print image data I/F 112, and supplies the bitmap data to the printer device 13. The CPU 101 transmits/receives control information to control printing through the control information I/F 111 between the CPU 101 and the printer device 13, according to a progress situation of the print operation.

Figure 6:
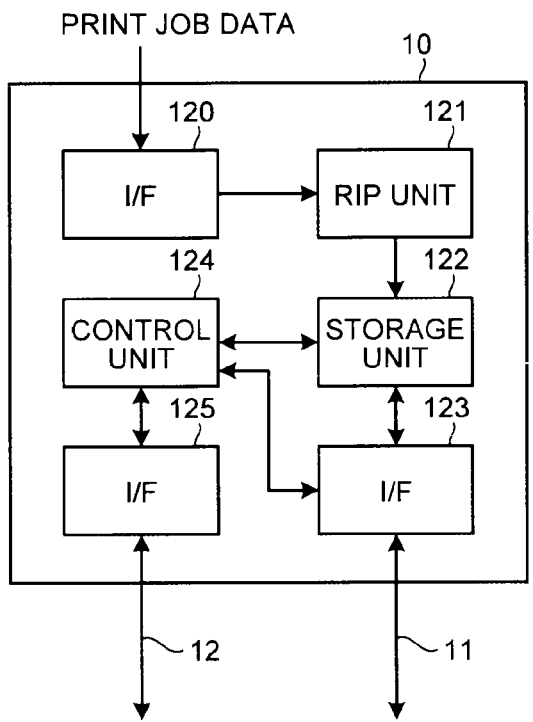
FIG. 6 is a functional block diagram illustrating an example of a function of the upper level device according to the second embodiment.

FIG. 6 is a functional block diagram illustrating an example of a function of the upper level device 10. The upper level device 10 includes interfaces (I/F) 120, 123, and 125, an RIP unit 121, a storage unit 122, and a control unit 124. The interfaces 120, 123, and 125 correspond to the external I/F 110, the print image data I/F 112, and the control information I/F 111, respectively, in FIG. 5. The RIP unit 121 and the control unit 124 are configured by a program operating on the CPU 101 in FIG. 5. The storage unit 122 corresponds to at least one of the RAM 103 or the HDD 104 in FIG. 5.

The print job data that includes the PDL data is generated by the host device 5 and is transmitted to the upper level device 10. The print job data is received in the interface 120 and is supplied to the RIP unit 121. The RIP unit 121 performs rendering on the basis of the PDL data included in the supplied print job data and generates print image data based on the bitmap data of each color of Y, C, M, and K. The RIP unit 121 sequentially stores the generated print image data of each color of Y, C, M, and K in the storage unit 122.

The control unit 124 communicates with the printer controller 14 of the printer device 13 through the interface 125. For example, the control unit 124 generates control information to control printing in the printer device 13, on the basis of the print job data supplied from the host device 5 through the interface 120. The control information is transmitted from the control unit 124 to the printer controller 14 through the interface 125.

The interface 123 is configured to have independent access to the print image data of each color of Y, C, M, and K stored in the storage unit 122. The interface 123 is connected to the printer device 13 through the plurality of data lines 11 corresponding to the individual colors of Y, C, M, and K, and exchanges control information related to print image data transfer of each color of Y, C, M, and K between the interface 123 and the printer device 13 or transmits print image data of each color of Y, C, M, and K.

<Printer Device>

Figure 7:
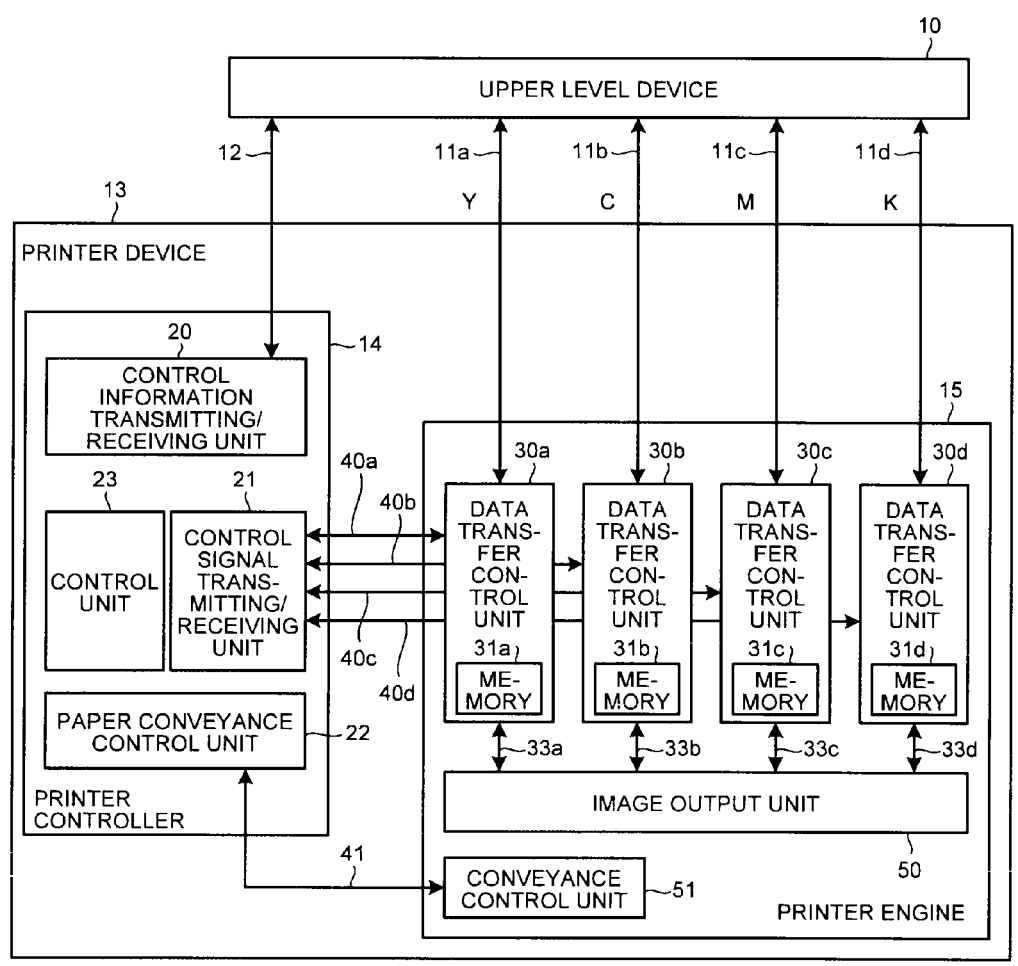
FIG. 7 is a block diagram illustrating an example of the configuration of a printer device according to the second embodiment.

FIG. 7 illustrates an example of the configuration of the printer device 13. The printer device 13 includes a printer controller 14 and a printer engine 15. The printer controller 14 is connected to the control line 12, and exchanges control information with the upper level device 10 through the control line 12 to control a print operation. The printer engine 15 is connected to the plurality of data lines 11a, 11b, 11c, and 11d and executes a printing process of print image data of each color that is transmitted from the upper level device 10 through the data lines 11a, 11b, 11c, and 11d according to the control of the printer controller 14.

The printer controller 14 and the printer engine 15 will be described in more detail. The printer controller 14 includes a control information transmitting/receiving unit 20, a control signal transmitting/receiving unit 21, a paper conveyance control unit 22, and a control unit 23.

The control information transmitting/receiving unit 20 exchanges control information to control printing with the upper level device 10 through the control line 12. The control signal transmitting/receiving unit 21 is connected to data transfer control units 30a, 30b, 30c, and, 30d to be described below through engine I/F control lines 40a, 40b, 40c, and 40d. The control signal transmitting/receiving unit 21 exchanges a control signal individually with the data transfer control units 30a, 30b, 30c, and 30d. The paper conveyance control unit 22 is connected to a conveyance control unit 51 to be described below through a conveyance control line 41 and exchanges a control signal with the conveyance control unit 51 to control paper conveyance.

The control unit 23 includes a CPU, a ROM, and a RAM, and uses the RAM as a work memory to control the individual units of the printer controller 14 according to a program previously stored in the ROM. The control unit 23 analyzes control information that is transmitted from the upper level device 10 and is received by the control information transmitting/receiving unit 20 and delivers the control information to the control signal transmitting/receiving unit 21 or the paper conveyance control unit 22.

The control information transmitting/receiving unit 20, the control signal transmitting/receiving unit 21, and the paper conveyance control unit 22 may be configured as hardware controlled by the control unit 23 and may be configured as a program module that operates on the control unit 23.

Figure 8:
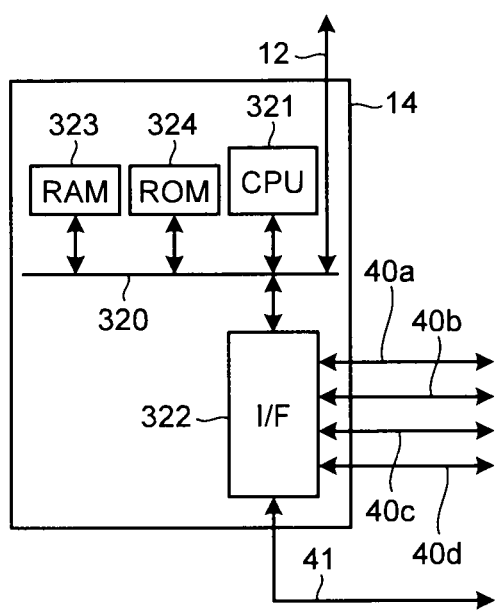
FIG. 8 is a block diagram illustrating an example of the configuration of a printer controller according to the second embodiment.

FIG. 8 illustrates an example of the hardware configuration of the printer controller 14. The printer controller 14 includes a CPU 321, an interface (I/F) 322, a RAM 323, and a ROM 324. The CPU 321, the interface (I/F) 322, the RAM 323, and the ROM 324 are connected to a bus 320 such that they can communicate with each other. To the bus 320, a control line 12 is also connected through a communication I/F not illustrated in the drawings. The CPU 321 operates using the RAM 323 as the work memory according to the program stored in the ROM 324 and controls all the operations of the printer device 13. The interface 322 includes a logic circuit that is configured in a hardware manner and controls communication with a printer controller 14, data transfer control units 30a, 30b, 30c, and 30d and the conveyance control unit 51.

In this configuration, for example, functions of the control signal transmitting/receiving unit 21 and the paper conveyance control unit 22 illustrated in FIG. 7 are realized by the I/F 322. The function of the control unit 23 is realized by the program operated on the CPU 321. The function of the control information transmitting/receiving unit 20 is realized by a communication I/F not illustrated in the drawings and the bus 320.

Returning to the description of FIG. 7, the printer engine 15 includes the plurality of data transfer control units 30a, 30b, 30c, and 30d that have the same configuration, an image output unit 50 that outputs an image based on the print image data to paper and forms an image, and the conveyance control unit 51 that controls conveyance of printing paper.

The data lines 11a, 11b, 11c, and 11d are connected to the data transfer control units 30a, 30b, 30c, and 30d, respectively. The data transfer control units 30a, 30b, 30c, and 30d include memories 31a, 31b, 31c, and 31d, respectively, and store the print image data of the individual colors transmitted from the upper level device 10 through the data lines 11a, 11b, 11c, and 11d in the memories 31a, 31b, 31c, and 31d.

Each of the memories 31a, 31b, 31c, and 31d has the same memory capacity and the same address configuration. Each of the memories 31a, 31b, 31c, and 31d preferably has the memory capacity that can store print image data of at least three pages. For example, the three pages of the print image data correspond to print image data of a page during transmission from the upper level device 10, print image data of a page during an output, and print image data of the next page. However, the present invention is not limited thereto and each of the memories 31a, 31b, 31c, and 31d may store print image data of two pages or less.

The data transfer control units 30a, 30b, 30c, and 30d are connected to the control signal transmitting/receiving unit 21 by the engine I/F control lines 40a, 40b, 40c, and 40d, respectively. The control signal transmitting/receiving unit 21 can transmit/receive a control signal between the data transfer control units 30a, 30b, 30c, and 30d through the engine I/F control lines 40a, 40b, 40c, and 40d.

Figure 9:
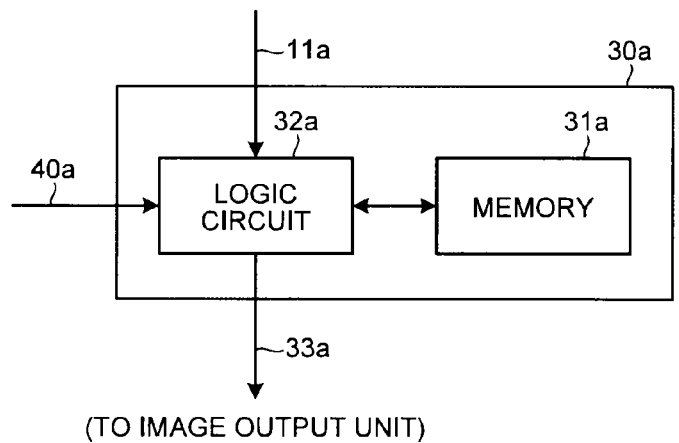
FIG. 9 is a block diagram schematically illustrating an example of the configuration of a data transfer control unit according to the second embodiment.

FIG. 9 schematically illustrates an example of the configuration of the data transfer control unit 30a. Since the common configuration is applied to the data transfer control units 30a, 30b, 30c, and 30d, the configuration of the data transfer control unit 30a among the data transfer control units 30a, 30b, 30c, and 30d is illustrated representatively in FIG. 9.

The data transfer control unit 30a includes a memory 31a and a logic circuit 32a. The engine I/F control line 40a and the data line 11a are connected to the logic circuit 32a. The logic circuit 32a stores the print image data transmitted from the upper level device 10 through the data line 11a in the memory 31a, according to the control signal received from the control signal transmitting/receiving unit 21 through the engine I/F control line 40a. Likewise, the logic circuit 32a reads the print image data from the memory 31a according to a control signal received from the control signal transmitting/receiving unit 21 through the engine I/F control line 40a and supplies the print image data to the image output unit 50 to be described through an output line 33a.

The control by the logic circuit 32a that is configured in a hardware manner with a combination of logic circuits is advantageous in that a high-speed process can be executed, over the control by a CPU which uses interrupts to make a program diverge into processes. For example, the logic circuit 32a performs logic determination with respect to a control signal based on a bit string that is received through the engine I/F control line 40a and determines a process to be executed. However, the present invention is not limited thereto and the same function as that of the logic circuit 32a may be realized in a hardware manner using the CPU.

The print image data of the individual colors that are output from the data transfer control units 30a, 30b, 30c, and 30d is supplied to the image output unit 50. The image output unit 50 executes printing based on the print image data of each color. In each embodiment, printing of the print image data is performed by an inkjet system that ejects ink from nozzles in heads and performs printing. However, the printing system is not limited to the inkjet system and a laser printer system may be used.

Figure 10:
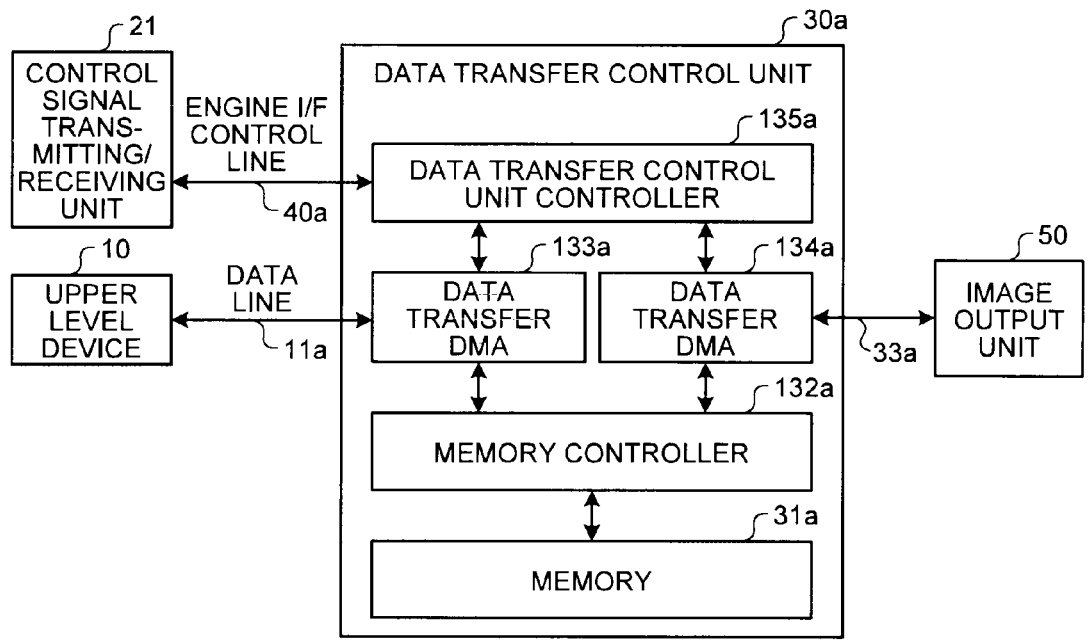
FIG. 10 is a block diagram specifically illustrating an example of the configuration of the data transfer control unit according to the second embodiment.

FIG. 10 specifically illustrates an example of the configuration of the data transfer control unit 30a. In FIG. 10, components that are common to those of FIG. 9 are denoted by the same reference numerals and the redundant description will not be repeated. The data transfer control unit 30a includes a memory 31a, a memory controller 132a, data transfer direct memory accesses (DMA) 133a and 134a, and a data transfer control unit controller 135a. Among these components, the memory controller 132a, the data transfer DMAs 133a and 134a, and the data transfer control unit controller 135a are included in the logic circuit 32a illustrated in FIG. 9.

The memory controller 132a controls access with respect to the memory 31a. The data transfer DMA 133a receives print image data from the upper level device 10 and writes the print image data in the memory through the memory controller 132a. The data transfer DMA 134a reads data from the memory 31a through the memory controller 132a and transmits the data to the image output unit 50 through the output line 33a. The data transfer control unit controller 135a receives control information that is transmitted from the control signal transmitting/receiving unit 21 in the printer controller 14 through the engine I/F control line 40a and controls the data transfer DMAs 133a and 134a according to the received control information.

For example, once a data transfer start request transmitted from the control signal transmitting/receiving unit 21 is received in the data transfer control unit controller 135a through the engine I/F control line 40a, the data transfer control unit controller 135a instructs the data transfer DMA 133a to start to transmit data, according to the data transfer start request. The data transfer DMA 133a transmits the data transfer request to the upper level device 10 through the data line 11a according to the instruction. For example, the data that is transmitted from the upper level device 10 according to the data transfer request is received in the data transfer DMA 133a and is written at a predetermined address of the memory 31a through the memory controller 132a.

Once the printing instruction that is transmitted from the control signal transmitting/receiving unit 21 is received in the data transfer control unit controller 135a through the engine I/F control line 40a, the data transfer control unit controller 135a instructs the data transfer DMA 134a to read data from the memory 31a. The data transfer DMA 134a reads data from the memory 31a through the memory controller 132a, according to the instruction. The data transfer DMA 134a transmits the read data to the image output unit 50 through the output line 33a.

Figure 11:
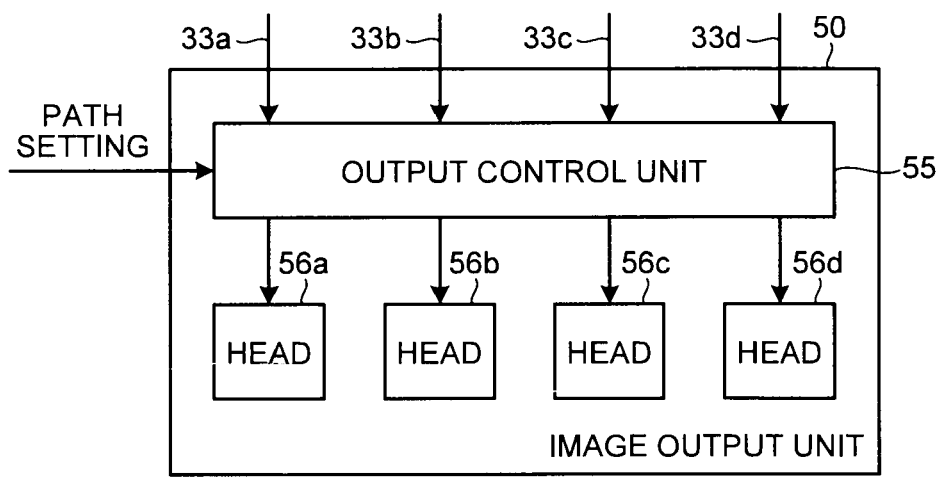
FIG. 11 is a block diagram illustrating an example of the configuration of an image output unit according to the second embodiment.

FIG. 11 illustrates an example of the configuration of the image output unit 50. The image output unit 50 includes an output control unit 55 and heads 56a, 56b, 56c, and 56d of the individual colors of Y, C, M, and K. A relation between the colors and the heads 56a, 56b, 56c, and 56d is not limited to the above example. The output control unit 55 controls connection of the output lines 33a, 33b, 33c, and 33d to which print image data of the data transfer control units 30a, 30b, 30c, and 30d is output and the heads 56a, 56b, 56c, and 56d. That is, the output control unit 55 can set a path such that each of the heads 56a, 56b, 56c, and 56d is connected to any one output line selected from the output lines 33a, 33b, 33c, and 33d.

For example, the output control unit 55 may set the output lines 33a, 33b, 33c, and 33d and the heads 56a, 56b, 56c, and 56d to be connected in a one-to-one relation. Further, the output lines 33a, 33b, 33c, and 33d may be set to be connected to the heads 56a, 56b, 56c, and 56d in a one-to-multiple relation, such that the heads 56a, 56b, 56c, and 56d are connected to the output line 33a.

Paths to connect the output lines 33a, 33b, 33c, and 33d with the heads 56a, 56b, 56c, and 56d may be set by an operation from the user using a DIP switch. However, the present invention is not limited thereto and the paths may be set by a control signal from the control signal transmitting/receiving unit 21.

As described above, in the printer device 13 according to each embodiment, transmission of the print image data from the upper level device 10 and transmission/reception of a control signal to control printing of the print image data between the upper level device 10 and the printer device 13 are performed through different paths. The print image data of the individual colors is transmitted from the upper level device 10 through the different data lines 11a, 11b, 11c, and 11d and the print image data of the individual colors that is transmitted through the data lines 11a, 11b, 11c, and 11d is independently controlled and is supplied to the data transfer control units 30a, 30b, 30c, and 30d that have the same configuration. Further, in the image output unit 50, connection paths of outputs of the data transfer control units 30a, 30b, 30c, and 30d and the heads 56a, 56b, 56c, and 56d of the individual colors can be set by a user operation or the like.

Therefore, the printer device 13 according to each embodiment can easily change the configuration of the printer engine 15, according to the number of colors of the print image data (four colors of Y, C, M, and K or only color of K) or the number of heads used by the image output unit 50. At this time, the printer engine 15 may be provided with only the necessary units among the data transfer control units 30a, 30b, 30c, and 30d according to the required configuration.

For example, in a case of performing a full-color printing with four colors Y, C, M, and K, all of the data transfer control units 30a, 30b, 30c, and 30d may be provided in the printer engine 15. In the output control unit 55, the outputs of the data transfer control units 30a, 30b, 30c, and 30d may be connected to the heads 56a, 56b, 56c, and 56d, respectively. For example, in a case of performing a mono-color printing with only color K, it may be configured from a cost viewpoint that only the data transfer control unit 30a is provided with only the head 56a. And, in the output control unit 55, the output of the data transfer control unit 30a can be connected to the head 56a. Alternatively, in the case of performing the mono-color printing with the only color K, it may be configured form a speed viewpoint that only the data transfer control unit 30a is provided with four heads 56a, 56b, 56c and 56d. And, in the output control unit 55, the output of the data transfer control unit 30a can be connected to four heads 56a, 56b, 56c and 56d. In this case, the same color is printed overlappingly a plurality of times. Therefore, for example, a high speed printing may be realized by shortening the ejection time of ink from heads 56a, 56b, 65c and 56d respectively to ¼ of the usual ejection time and increasing the conveyance speed of sheet paper to quadruple of the usual conveyance speed.

<Conveyance System of Printing Paper>

Figure 12:
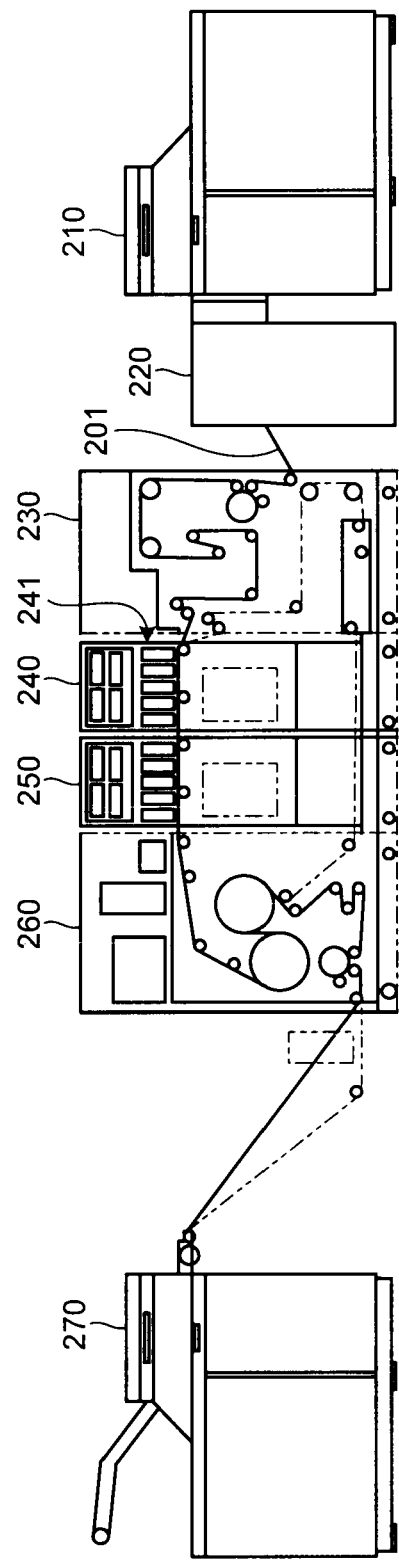
FIG. 12 is a schematic diagram schematically illustrating an example of the configuration of a printer device including a conveyance system of paper that can be applied to the second embodiment.

Referring to FIG. 7, the conveyance control unit 51 is connected to the paper conveyance control unit 22 by the conveyance control line 41 and controls conveyance of paper to which an image is formed by the image output unit 50 on the basis of the print image data. FIG. 12 schematically illustrates an example of the configuration of a printing device 200 that includes a conveyance system of paper that can be applied to each embodiment of the present invention. As described above, in each embodiment, the printing device 200 uses continuous paper as printing paper.

Printing paper 201 is fed from a printing paper feeding unit 210 to a first conveyance unit 230 through a power supply operation box 220. In the first conveyance unit 230, the printing paper 201 is conveyed through plural rollers by conveyance control of the conveyance control unit 51, is aligned, and is fed to printer engine units 240 and 250 that correspond to the printer engine 15.

In a printing unit 241 that corresponds to the image output unit 50, the printer engine units 240 and 250 perform printing according to print image data with respect to the printing paper 201 fed from the first conveyance unit 230. The printing paper 201 where the printing ends is discharged from the printer engine unit 250 by the conveyance control of the conveyance control unit 51 and is fed to a second conveyance unit 260. The printed paper 201 is conveyed to a predetermined position by the second conveyance unit 260 to be discharged, and is fed to a cutting unit 270. The printed paper 201 is cut by the cutting unit 270 according to perforations and divided into individual pages.

In this case, the printing paper continuously exists even in a path until the printing paper 201 is discharged from the second conveyance unit 260 after printing is performed on the printing paper 201 in the printer engine units 240 and 250, in order for the printing device 200 to perform printing on the printing paper 201 which is the continuous paper.

The configuration that includes the first conveyance unit 230, the printer engine units 240 and 250, and the second conveyance unit 260 is additionally prepared, the printed paper 201 that is discharged from the second conveyance unit 260 disposed on the front side is reversed and fed to the first conveyance unit 230 disposed on the rear side, and both-sided printing with respect to the printing paper 201 can be performed.

<Detail of Printing Process Applicable to Each Embodiment>

Next, a printing process applicable to each embodiment will be further described in detail. FIG. 13 illustrates an example of control information that is transmitted/received between the upper level device 10 and the printer controller 14 of the printer device 13 through the control line 12. In FIG. 13, the upper level device 10 is illustrated as a digital front end processor (DFE) and the printer controller 14 is illustrated as a PCTL. The control information roughly includes (i) job information, (ii) information indicating a printer status and a printing process, (iii) information indicating a printing condition, and (iv) information indicating a connection.

The job information is used to notify a job start and a job end. The job start includes a notification of the job start with respect to the printer controller 14 from the upper level device 10 and a response from the printer device 13 to the upper level device 10 with respect to the notification. The job end includes a notification of an end of all of the printing processes that are requested by the job start with respect to the printer controller 14 from the upper level device 10 and a response from the printer controller 14 to the upper level device 10 with respect to the notification. At the time of a response in the job start and the job end, a job identifier (JOBID) to identify a job is transmitted from the printer controller 14 to the upper level device 10.

The information indicating a printer status and a printing process includes a printing process reception start notification, a request/notification of printer information, a printing process start notification, a printing process request, a data transfer completion notification, a data reception completion notification, a printing process completion notification, a process status report, a service control (SC) notification, and an error occurrence and removal notification.

As for the printing process reception start notification, the printer device 13 notifies the upper level device 10 that the printer controller 14 is ready to receive a printing process. The request/notification of printer information includes a request of necessary printer information from the upper level device 10 to the printer controller 14, as well as a response to the request from the printer controller 14 to the upper level device 10.

The printing process start notification includes a notification from the upper level device 10 to the printer controller 14 indicating that the preparation of the print image data is completed and a response to the notification from the printer device 13 to the upper level device 10. The notification indicating that the preparation of the print image data is completed is notified in accordance with the sequence of the output of the print image data, page-by-page (process-by-process). It can be said that the page is a print unit by which a series of printing operation is performed.

The printing process request includes a notification of printing process from the printer controller 14 to the upper level device 10 and a response to the notification from the upper level device 10 to the printer controller 14. The printer controller 14 notifies the upper level device 10 of color information (yellow, cyan, magenta, or black) indicating the colors Y, C, M, and K to perform printing, a process identification number (process ID), and a plane identification number. Incidentally, the plane corresponds to each image based on each color print image data to be printed in one page. The printer controller 14 notifies these kinds of information for every plane in accordance with the sequence of requests from engine, i.e. the data transfer control units 30*a*, 30*b*, 30*c* and 30*d*. That is, the printer engine 15 retrieves the print image data composed of bitmap data from the upper level device 10.

As for the data transfer completion notification, the completion of transferring the print image data as for the requested plane is notified from the upper level device 10 to the printer controller 14. As for the data reception completion notification, the completion of receiving the print image data as for the requested plane is notified from the printer controller 14 to the upper level device 10. As for the printing process completion notification, the completion of print request for all pages (process) is notified from the upper level device 10 to the printer controller 14. As for the process status report, the print status of pages (process) is notified from the printer controller 14 to the upper level device 10. At this time, the printer controller 14 acquires from the printer engine 15 the information about feeding or discharging of sheets or the information about the print start timing, and adds the acquired information to the completion notification. Then, the notification to which the acquired information is added is transmitted to the upper level device 10.

As for the SC notification, an acquisition of obstacle information is requested from the upper level device 10 to the printer controller 14. The obstacle information acquired according to the request is notified from the printer controller 14 to the upper level device 10. As for the error occurrence and removal, an occurrence of any error and a removal thereof at the upper level device 10 is notified from the upper level device 10 to the printer controller 14.

The information indicating printing conditions includes setting the printing conditions, that is, a notification of the printing conditions from the upper level device 10 to the printer controller 14 and a response from the printer controller 14 to the notification. Examples of the printing conditions include a printing form, a printing type, feeding/discharging information, printing surface order, a printing paper size, a print data size, resolution and gradation, and color information.

The printing form indicates, for example, whether both-sided printing or a single-sided printing is performed on the printing paper 201. The printing type indicates whether print image data exists and thus the print image data is printed or the print image data does not exist and thus a white page is output without printing the print image data. The feeding/discharging information indicates identification information, such as a stacker of a discharging destination or a feeding origin of the printing paper 201. The printing surface order indicates whether printing is performed from a front surface to a back surface of the printing paper 201 or is performed from the back surface to the front surface. The printing paper size indicates, for example, the length of a page to be printed in a conveyance direction of the printing paper 201, when continuous paper is used as the printing paper 201. The print data size indicates a data size of the print image data. That is, the print data size indicates a size of the print image data corresponding to one page. The resolution and gradation indicates resolution and gradation of the case where the print image data is printed on the printing paper 201. The color information indicates, for example, whether to perform printing using a full color in which the colors Y, C, M, and K are used, or to perform printing using a single color in which only the color K is used.

The information indicating the connection includes registration and release, and specifically includes registration of information in each opponent between the upper level device 10 and the printer controller 14, and release of the registered information.

In the present embodiment, the control information is transmitted/received between the upper level device 10 and the printer controller 14 through the control line 12 that is compatible with Ethernet®. Print image data and print commands are transmitted/received between the upper level device 10 and the data transfer control unit 30 of the printer engine 15 through the data line 11 that is compatible with PCI Express and has a higher transfer speed than the control line 12.

Thus, in the present embodiment, the control information is transmitted/received through the control line (Ethernet®, or the like), and the print image data is transmitted through the data line (PCI Express, or the like) that allows high-speed transfer of large-volume data. Thus, even if uncompressed data is transferred, the data can be transferred while the performance of the printer is fully utilized. In the case of a higher-speed and higher-performance printer, the engine performance can be fully utilized during data transmission.

In the present embodiment, the control line 12 for connecting the printer controller 14 to the upper level device 10 may be made up of two control lines, i.e., a first control line that is compatible with Ethernet (registered trademark) and a second control line that is compatible with PCI Express and has a higher transfer speed than the first control line. Furthermore, in the same manner as the first embodiment, the transmission and reception of control information, for which the processing speed is adequate, may be performed via the first control line (Ethernet®, or the like) and the transmission of control information (specific control information), for which the processing speed is inadequate, may be performed via the second control line (PCI Express, or the like) that allows high-speed transfer of large-volume data. In such a case, the sequence of the transmission and reception between the upper level device 10 and the printer controller 14 and between the upper level device 10 and the data transfer control unit 30 is the same as that illustrated in FIG. 3 in the first embodiment.

According to the present invention, even if the speed and performance of an image forming device are further improved, data can be transferred while the performance of an engine is fully utilized.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A printing system comprising a print-data generating device and a printing device, wherein the print-data generating device is connected to the printing device via a first bidirectional transmission path and a second bidirectional transmission path, the second transmission path having a higher transfer speed than that of the first transmission path, the print-data generating device includes a generating unit that generates print data comprising bitmap image data; and a first communication unit that transmits the print data comprising bitmap image data to the printing device via the second transmission path and that transmits and receives control information to and from the printing device via the first transmission path, the printing device includes a printing unit that prints the print data; and a second communication unit that receives the print data comprising bitmap image data from the print-data generating device via the second transmission path and that transmits and receives the control information to and from the print-data generating device via the first transmission path, the first communication unit transmits and receives, to and from the printing device via the second transmission path, specific control information that is included in the control information and that affects transfer of the print data, and the second communication unit transmits and receives the specific control information to and from the print-data generating device via the second transmission path, wherein the first transmission path is a transmission path that is compatible with Ethernet®, and the second transmission path is a transmission path that is compatible with PCI Express.

2. The printing system according to claim 1, wherein the specific control information is at least one of control information that requests transfer of the print data, control information that notifies reception of a transfer request of the print data, control information that notifies completion of transmission of the print data, and control information that notifies completion of reception of the print data.

3. A printing system comprising an upper level device and a printing device, the printing device including a plurality of data transfer control units that store in memories image data transferred from the upper level device;

an output control unit that controls printing of the image data stored by the data transfer control units; and a print control unit that controls the data transfer control units and the output control unit, wherein the upper level device is connected to the print control unit through a first bidirectional transmission path the upper level device is connected to the data transfer control units through a second bidirectional transmission path, the second transmission path having a higher transfer speed than that of the first transmission path, the upper level device and the print control unit transmit and receive control information to and from each other through the first transmission path, and the upper level device and each of the data transfer control units transmit and receive the image data to and from each other through the second transmission path, wherein the first transmission path is a transmission path that is compatible with Ethernet®, and the second transmission path is a transmission path that is compatible with PCI Express.

4. A printing device that is connected to an upper level device, the printing device comprising:

a plurality of data transfer control units that store in memories image data transferred from the upper level device;

an output control unit that controls printing of the image data stored by the data transfer control units; and a print control unit that controls the data transfer control units and the output control unit, wherein the print control unit is connected to the upper level device through a first bidirectional transmission path, each of the data transfer control units is connected to the upper level device through a second bidirectional transmission path, the second transmission path having a higher transfer speed than that of the first transmission path, the print control unit transmits and receives control information to and from the upper level device through the first transmission path, and each of the data transfer control units transmits and receives the image data to and from the upper level device through the second transmission path, wherein the first transmission path is a transmission path that is compatible with Ethernet®, and the second transmission path is a transmission path that is compatible with PCI Express.

* * * * *